(12) United States Patent
Kibayashi

(10) Patent No.: US 10,245,900 B2
(45) Date of Patent: Apr. 2, 2019

(54) TIRE

(71) Applicant: BRIDGESTONE CORPORATION, Tokyo (JP)

(72) Inventor: Yoshikazu Kibayashi, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/433,551

(22) PCT Filed: Oct. 30, 2013

(86) PCT No.: PCT/JP2013/079341
§ 371 (c)(1),
(2) Date: Apr. 3, 2015

(87) PCT Pub. No.: WO2014/073422
PCT Pub. Date: May 15, 2014

(65) Prior Publication Data
US 2015/0224829 A1    Aug. 13, 2015

(30) Foreign Application Priority Data

Nov. 7, 2012   (JP) ................. 2012-245186

(51) Int. Cl.
*B60C 15/00* (2006.01)
*B60C 15/06* (2006.01)

(52) U.S. Cl.
CPC .......... *B60C 15/06* (2013.01); *B60C 15/0027* (2013.01); *B60C 15/0036* (2013.01); *B60C 15/0607* (2013.01); *B60C 2015/061* (2013.01)

(58) Field of Classification Search
CPC ...... B60C 2001/005; B60C 2001/0058; B60C 15/00; B60C 15/06; B60C 15/0603;
(Continued)

(56) References Cited

U.S. PATENT DOCUMENTS 4,019,551 A * 4/1977 Kolowski ............... B60C 15/06
152/541
7,152,645 B2 * 12/2006 Tsukagoshi ............ B29D 30/32
152/539
(Continued)

FOREIGN PATENT DOCUMENTS

CN        101306634 A       11/2008
DE        102005049182   *   4/2007
(Continued)

OTHER PUBLICATIONS

Machine translation of WO 2007/042119, 2007.*
(Continued)

*Primary Examiner* — Justin R Fischer
(74) *Attorney, Agent, or Firm* — Sughrue Mion, PLLC

(57) ABSTRACT

A tire (1) in which a carcass fold-back portion (40) is wound around a bead core (10) includes a hard bead filler (50) arranged on an outer side of a carcass (20) in the tread width direction (twd), the hard bead filler (50) extends, along a tire radial direction (trd), from an outer side of the bead core (10) at least to a center (BO) of the bead core (10), and a thickness (t) of the hard bead filler (50) along the tread width direction (twd) is not shorter than 0.5 mm on a straight line (L) passing over the center (BO) of the bead core (10) in the tread width direction (twd).

5 Claims, 3 Drawing Sheets

(58) Field of Classification Search
CPC .......... B60C 15/0607; B60C 2015/061; B60C 2015/0614
See application file for complete search history.

(56) References Cited

U.S. PATENT DOCUMENTS

| | | | |
|---|---|---|---|
| 7,172,002 B2 * | 2/2007 | Ueyoko | B60C 5/14 152/510 |
| 7,997,318 B2 | 8/2011 | Maruoka | |
| 8,167,016 B2 | 5/2012 | Maruoka | |
| 2002/0062897 A1 | 5/2002 | Mani et al. | |
| 2008/0283170 A1 | 11/2008 | Maruoka | |
| 2011/0162775 A1 | 7/2011 | Maruoka | |

FOREIGN PATENT DOCUMENTS

| | | | |
|---|---|---|---|
| GB | 1186139 | * | 4/1970 |
| JP | 06-064412 A | | 3/1994 |
| JP | 2000-309210 A1 | | 11/2000 |
| JP | 2001-71718 | * | 3/2001 |
| JP | 2007-076549 A | | 3/2007 |
| JP | 2009018717 A | | 1/2009 |
| JP | 2010-167940 A | | 8/2010 |
| WO | WO 2007/042119 | * | 4/2007 |

OTHER PUBLICATIONS

Machine translation of DE 102005049182, 2007.*
Communication dated May 4, 2016, from the European Patent Office in counterpart European Application No. 13852437.6.
International Search Report of PCT/JP2013/079341 dated Jan. 14, 2014.
Communication dated Apr. 5, 2016 from the State Intellectual Property Office of the P.R.C. issued in corresponding Application No. 201380052621.8.

* cited by examiner

TIRE

CROSS REFERENCE TO RELATED APPLICATIONS

This is a National Stage of International Application No. PCT/JP2013/079341 filed Oct. 30, 2013, claiming priority based on Japanese Patent Application No. 2012-245186 filed Nov. 7, 2012, the contents of all of which are incorporated herein by reference in their entirety.

TECHNICAL FIELD

The present invention relates to a tire that includes a pair of bead cores and a carcass extending between the pair of bead cores, wherein the carcass includes a carcass main portion that extends between the pair of bead cores, and carcass fold-back portions that are folded back to outsides, along a tread width direction, of the pair of bead cores, respectively, and the carcass fold-back portions are wound around the bead cores, respectively.

BACKGROUND ART

A carcass that extends between a pair of bead cores includes a carcass body portion that extends between the pair of bead cores, and carcass fold-back portions that are folded back to outsides, along a tread width direction, of the pair of bead cores, respectively. A tire with a structure in which these carcass fold-back portions are wound around the bead cores, i.e. a so-called wind bead structure is widely known (for example, see Patent Literature 1).

The tire with the wind bead structure can restrict deformations to be generated at outer-side ends, along a tire radial direction, of the carcass fold-back portions (hereinafter, they are referred to carcass outer-side ends), because the carcass fold-back portions locate at positions near the bead cores whose deformations are small. As the result, the carcass outer-side ends become less separated from surrounding rubber members, and thereby durability of the bead portions can be improved.

PRIOR ART DOCUMENT

Patent Literatures

Patent Literature 1: Japanese Patent application Laid-Open No. 2007-76549

SUMMARY OF INVENTION

In a tire with a high inner pressure, a strong tensile force acts on the carcass. Therefore, the carcass main portion near the bead portions is pulled to an outer side in the tire radial direction, and the carcass fold-back portions are pulled to an inner side in the tire radial direction along the bead cores. Since a length of the carcass fold-back portion(s) is shorter in a tire with the wind bead structure than that in a tire with a general bead structure, a pullout of the carcass tends to occur easily.

Therefore, the present invention is made in consideration of such a situation, and intends to improve, in a tire with the wind bead structure, durability of its bead portion by restricting a pullout of its carcass.

In order to solve the above-mentioned problem, the present invention has a following aspect. The aspect of the present invention is a tire (tire 1) that includes a pair of bead cores (bead cores 10), and a carcass (carcass 20) that extends between the pair of bead cores, wherein the carcass includes a carcass main portion (carcass main portion 30) that extends between the pair of bead cores, and carcass fold-back portions (carcass fold-back portions 40) that are folded back to outsides, along a tread width direction (tread width direction twd), of the pair of bead cores, respectively, and the carcass fold-back portions are wound around the bead cores, respectively, and each of the carcass fold-back portions includes a carcass outer-side end that is an outer-side end in a tire radial directions, the tire (1) comprises: a hard bead filler (hard bead filler 50) that is arranged on an outer side of the carcass in the tread width direction; and a soft bead filler (soft bead filler 60) that is softer than the hard bead filler, wherein the hard bead filler extends, along the tire radial direction (tire radial direction trd), from an outer side of the bead core at least to a center (center BO) of the bead core (10), the soft bead filler being located between the carcass outer-side end and the hard bead filler along the tire radial direction, and a thickness (thickness t) of the hard bead filler along the tread width direction is not shorter than 0.5 mm on a straight line (straight line 1) passing over the center of the bead core in the tread width direction.

The bead filler has higher hardness than that of a general rubber member that composes a bead portion, and thereby less deforms than the general rubber member. For this reason, even when the bead portion slants, the rubber member (including a portion of the hard bead filler 50) arranged on an outer-side, along the tread width direction, of the bead core less expands to an inner-side in the tire radial direction. Therefore, stress toward the inner-side in the tire radial direction generated along with deformation of the rubber member on the outer-side of the bead core reduces and thereby the carcass fold-back portion extending along the bead core less moves to the inner-side in the tire radial direction, so that it becomes possible to restrict a pullout of the carcass and durability of the bead portion can be improved. In addition, the bead filler may contact with the carcass main portion.

According to the present invention, it becomes possible to restrict a pullout of a carcass and thereby improve durability of a bead portion in a tire with the wind bead structure.

DESCRIPTION OF EMBODIMENTS

An example of a tire according to the present invention will be described with reference to the drawings. Specifically, (1) GENERAL CONFIGURATION OF TIRE 1, (2) FUNCTIONS AND ADVANTAGES, (3) COMPARATIVE EVALUATION, and (4) OTHER EMBODIMENTS will be described.

In following descriptions about the drawings, identical or equivalent portions are labelled with identical or equivalent reference numbers. The drawings are schematic, and it should be kept in mind that ratios of dimensions and so on may be different from their actual ones. Therefore, specific dimensions and so on should be understood in consideration of following descriptions. Of course, they may include portions that are different in their mutual relations of dimensions and their mutual ratio among the drawings.

(1) General Configuration of Tire 1

Figure 1:
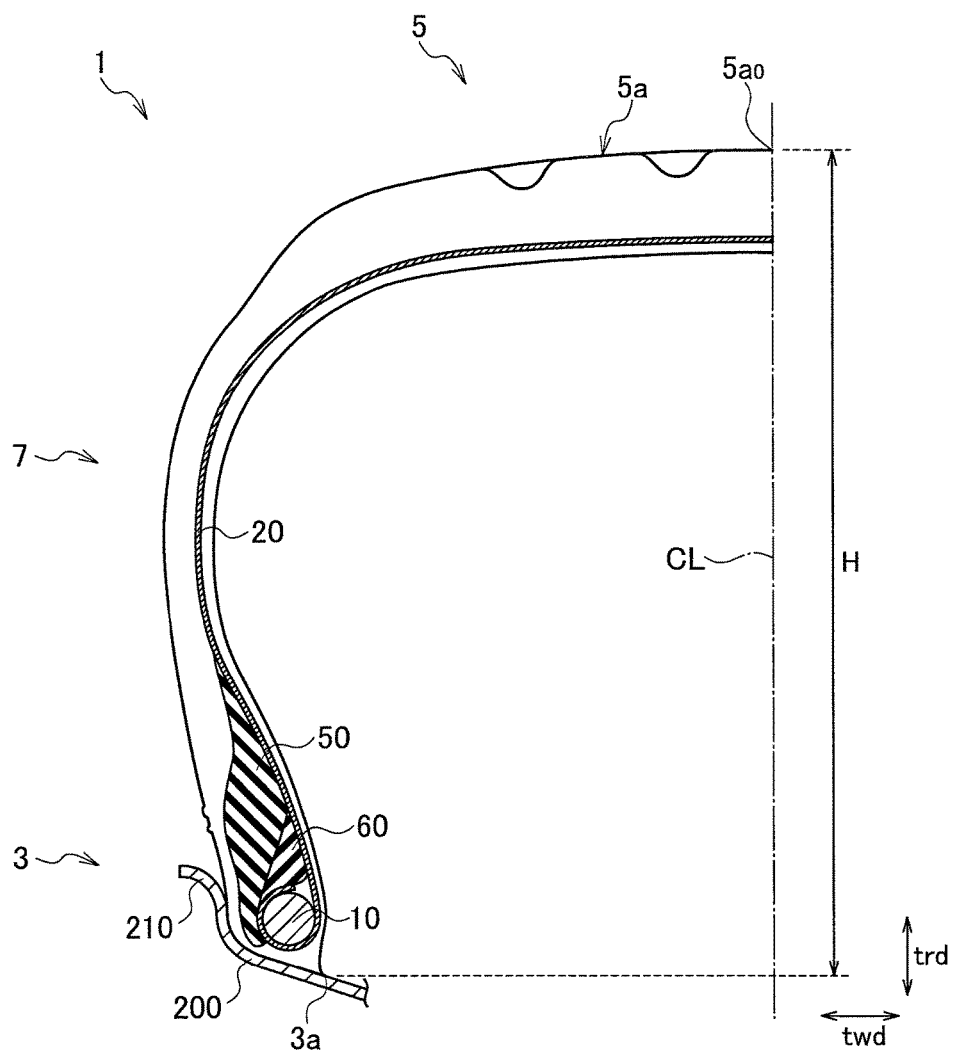
FIG. 1 is a cross-sectional view, along a tire radial direction trd and a tread width direction twd, of a tire 1 according to an embodiment.
Figure 2:
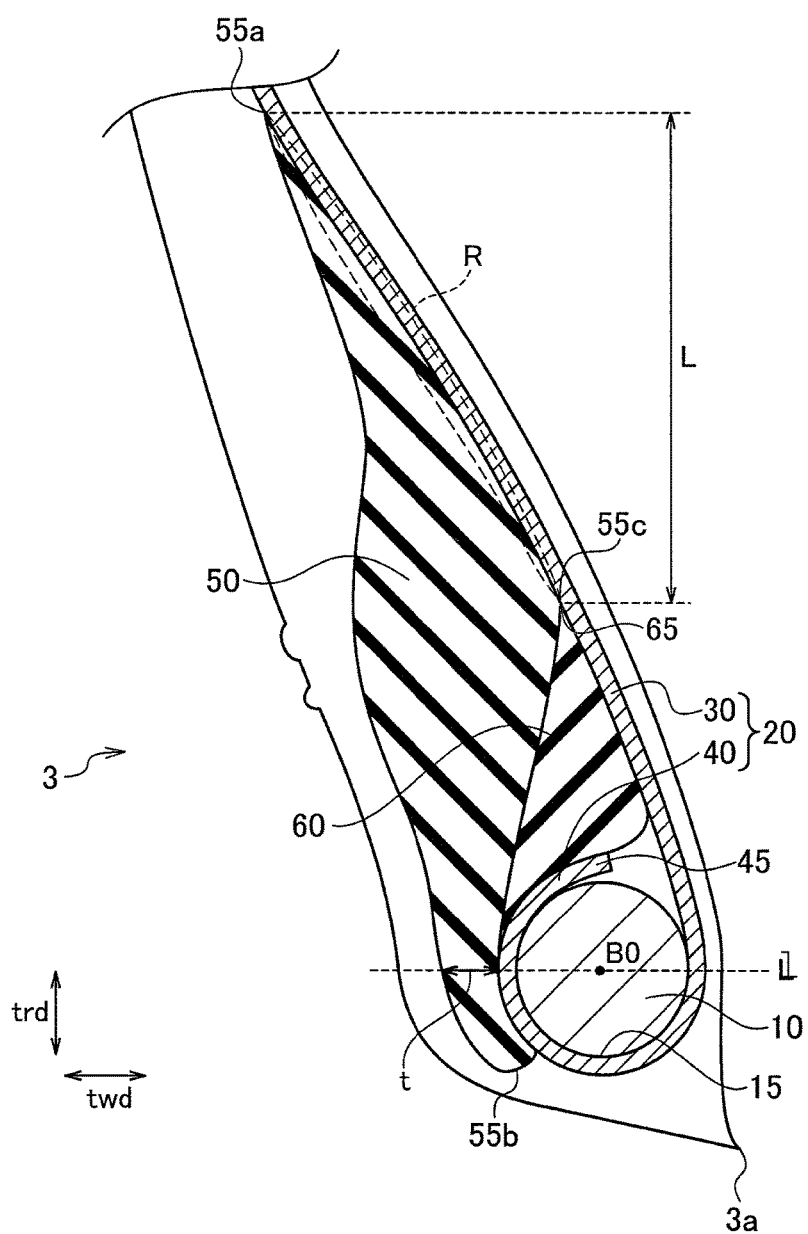
FIG. 2 is an enlarged view of a bead portion 3 in FIG. 1.

A general configuration of a ire 1 according to the present embodiment will be described with reference to FIG. 1 and FIG. 2. FIG. 1 is a cross-sectional view, along a tire radial direction trd and a tread width direction twd, of the tire 1 according to the present embodiment. FIG. 2 is an enlarged view of a bead portion 3 in FIG. 1.

The tire 1 is installed on a rim 200 that serves as a regulated rim. The tire 1 has a regulated inner pressure, and a regulated load is applied thereto. Note that the rim 200 includes a rim flange(s) 210 that supports the bead portion(s) 3 in the tread width direction twd.

Note that the "regulated rim" refers to a standard rim for an applied size regulated in a Year Book 2008 of the JATMA (Japan Automobile Tyre Manufacturers Association, Inc.). Other than Japan, it refers to a standard rim for an applied size regulated in after-mentioned standards.

Note that the "regulated inner pressure" refers to an air pressure regulated in a measurement method of a tire (0 to 3 pages in item 5) of the Year Book 2008 of the JATMA (Japan Automobile Tyre Manufacturers Association, Inc.). Other than Japan, the "regulated inner pressure" refers to an air pressure associated with an air pressure at a measurement time of a dimension of a tire regulated in the after-mentioned standards.

Note that the "regulated load" refers to a load corresponding to a maximum load capacity, in a case where a single wheel is applied, regulated in the Year Book 2008 of the JATMA (Japan Automobile Tyre Manufacturers Association, Inc.). Other than Japan, the "regulated load" refers to a maximum load (a maximum load capacity) for a single wheel regulated in the after-mentioned standards. The standards are regulated by industrial standards valid for regions where a tire is used. For example, they are a "Year Book of The Tire and Rim Association Inc." in the United States of America and a "Standard Manual of The European Tyre and Rim Technical Organization" in the Europe.

As shown in FIG. 1, the tire 1 has the bead portion(s) 3, a tread portion 5, and a sidewall portion(s) 7.

The bead portion 3 contacts with the rim 200. A bead core 10 is disposed in the bead portion 3. The bead portion 3 includes a bead toe 3a that is an inner-most portion in the tire radial direction trd. The tread portion 5 has a tread surface 5a that contacts with a road surface. The tread surface 5a includes a tread outer-most surface 5a₀ that is an outer-most surface in the tire radial direction trd. In the present embodiment, the tire 1 is laterally symmetrical with respect to a tire equator line CL, so that the tire outer-most surface 5a₀ locates on the tire equator line CL.

The bead core 10 is disposed in the bead portion 3, and configured by bead wires (not shown in the drawings). In a cross-sectional plane along the tire radial direction trd and the tread width direction twd of the tire 1, the bead core 10 has a center BO in the tire radial direction trd. The bead core 10 has an inner-side surface 15 that is an inner-most surface in the tire radial direction trd.

A carcass 20 configures a framework of the tire 1, and extends from the tread portion 5 to the bead portion 3 through the sidewall portion 7. The carcass 20 is made by coating plural cords by rubber.

A carcass fold-back portion(s) 40 is folded back to an outside, in the tread width direction twd, at a pair of the bead cores 10 to be wound around the bead core(s) 10, and includes a carcass outer-side end 45 that is an outer-side end in the tire radial direction trd. In the present embodiment, the carcass outer-side end 45 contacts with a soft bead filler 60. The carcass outer-side end 45 locates on an inner side of the soft bead filler 60 in the tire radial direction trd. Note that, in the present embodiment, the carcass outer-side end 45 doesn't contact with a hard bead filler 50.

The hard bead filler 50 enhances rigidity of the bead portion 3, and is located on an outer side of the carcass 20 in the tread width direction twd. Specifically, the hard bead filler 50 is located on an outer side of a carcass main portion 30 and the carcass fold-back portion 40 in the tread width direction twd.

The hard bead filler 50 extends, along the tire radial direction trd, from the outer side of the bead core 10 at least to the center BO of the bead core 10. In the present embodiment, the hard bead filler 50 extends to an inner side from the inner-side surface 15 of the bead core 10 in the tire radial direction trd. Therefore, when viewing from the tread width direction twd, the bead core 10 is completely covered by the hard bead filler 50. Note that, when viewing from the tread width direction twd, it is sufficient that a portion of the bead core 10 from its center BO to its outer surface in the tire radial direction is covered by the hard bead filler 50.

The hard bead filler 50 contacts with the carcass 20 and the soft bead filler 60. Specifically, the hard bead filler 50 contacts with the carcass main portion 30, the soft bead filler 60 and the carcass fold-back portion 40 in this order from an outer side to an inner side of the tire radial direction trd.

A region R is a region where the hard bead filler 50 and the carcass main portion 30 contact with each other. In the cross-sectional plane along the tire radial direction trd and the tread width direction twd, the hard bead filler 50 contacts with the carcass main portion 30 from a hard bead filler outer-side end 55a to a hard bead filler contact inner-side end 55c. The hard bead filler contact inner-side end 55c is a position locating at an inner-most side, in the tire radial direction trd, of a portion of the hard bead filler 50 that contacts with the carcass main portion 30. A length of the region R along the tire radial direction trd is a contact length L. The contact length L is equal to a length in the tire radial direction trd from the hard bead filler outer-side end 55a to the hard bead filler contact inner-side end 55c. Note that, in a case where the tire 1 includes the hard bead filler 50 and the soft bead filler 60 similarly to the present embodiment, the contact length L is a length in the tire radial direction trd where the carcass main portion 30 and the hard bead filler 50 contact with each other, and doesn't include a length in the tire radial direction trd where the carcass main portion 30 and the soft bead filler 60 contact with each other.

The soft bead filler 60 locates between the carcass outer-side end 45 and the hard bead filler 50 along the tire radial direction trd. In addition, the soft bead filler 60 locates between the carcass main portion 30 and the hard bead filler 50 along the tread width direction twd. In the present embodiment, the soft bead filler 60 contacts with the carcass main portion 30, the carcass fold-back portion 40 and the hard bead filler 50. The soft bead filler 60 includes a soft bead filler outer-side end 65 that is an outer-side end in the tire radial direction trd. In the present embodiment, the soft bead filler outer-side end 65 contacts with the carcass main portion 30.

The soft bead filler 60 is softer than the hard bead filler 50. Specifically, the Young's modulus of the soft bead filler 60 is smaller than the Young's modulus of the hard bead filler 50. For example, the Young's modulus of the hard bead filler 50 is not smaller than 10 MPa and not larger than 40 MPa. For example, the Young's modulus of the soft bead filler 60 is not smaller than 3 MPa and not larger than 30 MPa.

(2) Functions and Advantages

In the tire 1, on a straight line 1 passing over the center BO of the bead core 10 in the tread width direction twd, a thickness t of the hard bead filler 50 along the tread width direction twd is not shorter than 0.5 mm.

The hard bead filler 50 has higher hardness than that of a rubber member which generally composes the bead portion 3, so that the hard bead filler 50 less deforms than the general rubber member. For this reason, even when the bead portion 3 slants, the rubber member on an outer-side of the bead core including a portion of the hard bead filler 50 less expands to an inner-side in the tire radial direction trd. Therefore, stress toward the inner-side in the tire radial direction trd generated along with the deformation of the rubber member on the outer-side of the bead core reduces, so that the carcass fold-back portion 40 extending along the bead core 10 less moves to the inner-side in the tire radial direction trd. As the result, it becomes possible to restrict a pullout of the carcass 20, and thereby durability of the bead portion 3 can be improved.

In the present embodiment, the hard bead filler 50 contacts with the carcass main portion 30. Since the hard bead filler 50 less deforms than the general rubber member, a movement of the carcass main portion 30 contacting with the hard bead filler 50 to an outer side in the tire radial direction trd is restricted. As the result, it becomes possible to restrict a pullout of the carcass 20, and thereby durability of the bead portion 3 can be improved.

In addition, it is preferable that a ratio L/H of the contact length L to a tire height H is not smaller than 0.01 and not larger than 0.5. When the L/H is not smaller than 0.01, a movement amount of the carcass main portion 30 contacting with the hard bead filler 50 to the outer side in the tire radial direction trd can be restricted sufficiently. When the L/H is not larger than 0.5, rigidity along the tire radial direction trd is not increased drastically, and thereby ride comfort can be improved. In addition, when the L/H is not larger than 0.5, weight of the hard bead filler 50 doesn't increase, and thereby increase of rolling resistance can be restricted.

In the present embodiment, the soft bead filler 60 locates between the carcass outer-side end 45 and the hard bead filler 50 in the tire radial direction trd. The soft bead filler 60 serves as a damper, and thereby deformation generated due to arrangement of the hard bead filler 50 having high hardness gets less concentrated on the carcass outer-side end 45. As the result, separation of a fold-back end of the carcass from a surrounding rubber member can be restricted.

(3) Comparative Evaluation

Anti-pullout performance is evaluated by using following tires in order to confirm the advantages of the present invention. Note that the present invention is not limited to following practical samples.

In a tire according to a comparative sample 1, along the straight line 1 passing over the center BO of the bead core 10 in the tread width direction twd, the thickness t of the hard bead filler 50 along the tread width direction twd is 0.5 mm. In addition, in the tire according to the comparative sample 1, the hard bead filler doesn't contact with the carcass main portion, so that the ratio L/H of the contact length L to the tire height H is 0. Further, the tire according to the comparative sample 1 doesn't include the soft bead filler.

The thickness t is 1.5 mm in a tire according to a comparative sample 2, the thickness t is 2.5 mm in a tire according to a comparative sample 3, and the thickness t is 3.5 mm in a tire according to a comparative sample 4. Other portions in the tires according to the comparative samples 2 to 4 are identical to those in the tire according to the comparative sample 1.

In a tire according to a practical sample 1, the thickness t is 0.5 mm. In addition, in the tire according to the practical sample 1, the hard bead filler contacts with the carcass main portion, and the ratio L/H of the contact length L to the tire height H is 0.005. Further, the tire according to the practical sample 1 includes the soft bead filler locating between the carcass outer-side end and the hard bead filler along the tire radial direction trd. Other portions in the tire according to the practical sample 1 are identical to those in the tire according to the comparative sample 1.

The bead filler contacts with the carcass main portion and the L/H is 0.01 in a tire according to a practical sample 2, the L/H is 0.3 in a tire according to a practical sample 3, the L/H is 0.5 in a tire according to a practical sample 4, and the L/H is 0.55 in a tire according to a practical sample 5. Other portions in the tires according to the practical samples 2 to 5 are identical to those in the tire according to the practical sample 1.

In a tire according to a comparative sample 0, the thickness t is 0 mm. Namely, in the tire according to the comparative sample 0, a hard bead filler inner-side end locates on an outer side from the center of the bead core in the tire radial direction trd.

Water pressure tests are carried out by using the tires according to the practical samples 1 to 5 and the comparative samples 0 to 4. Specifically, under a condition where each of the tires according to the practical samples 1 to 5 and the comparative samples 0 to 4 is installed on a rim for the water pressure test, water is supplied into each inside of the tires according to the practical samples 1 to 5 and the comparative samples 0 to 4. With respect to each of the tires according to the practical samples 1 to 5 and the comparative samples 0 to 4, a pullout length of the carcass is measured with a predetermined water pressure. The pullout length of the tire according to the comparative sample 0 is indicated as 100, and the pullout lengths of the other tires are indicated by index numbers. The results are shown in a Table 1.

Note that it is shown that the smaller the value of the anti-pullout performance is, the higher durability of the bead portion is.

TABLE 1

| | THICK-NESS t | L/H | EXISTENCE OR NON-EXISTENCE OF SOFT BEAD FILLER | ANTI-PULLOUT PERFOR-MANCE |
|---|---|---|---|---|
| COMPARATIVE SAMPLE 0 | 0 | 0 | X | 100 |
| COMPARATIVE SAMPLE 1 | 0.5 | 0 | X | 88.8 |
| COMPARATIVE SAMPLE 2 | 1.5 | 0 | X | 85.4 |
| COMPARATIVE SAMPLE 3 | 2.5 | 0 | X | 82.8 |
| COMPARATIVE SAMPLE 4 | 3.5 | 0 | X | 82.5 |

TABLE 1-continued

|  | THICK-NESS t | L/H | EXISTENCE OR NON-EXISTENCE OF SOFT BEAD FILLER | ANTI-PULLOUT PERFORMANCE |
|---|---|---|---|---|
| PRACTICAL SAMPLE 1 | 0.5 | 0.005 | ◯ | 81.8 |
| PRACTICAL SAMPLE 2 | 0.5 | 0.01 | ◯ | 79.9 |
| PRACTICAL SAMPLE 3 | 0.5 | 0.3 | ◯ | 76.1 |
| PRACTICAL SAMPLE 4 | 0.5 | 0.5 | ◯ | 72.5 |
| PRACTICAL SAMPLE 5 | 0.5 | 0.55 | ◯ | 72.5 |

As shown in the Table 1, it is found that the anti-pullout performance is better in the tires according to the comparative samples 1 to 4 and the practical examples 1 to 5 than in the tire according to the comparative sample 0.

In addition, it is found that the anti-pullout performance is better in the tires according to the practical samples 1 to 5 than in the tires according to the comparative samples 1 to 4. It is considered that the soft bead filler serves as a damper for restricting concentration of deformation on the outer-side end of the carcass and thereby separation of the fold-back end of the carcass from a surrounding rubber member can be restricted.

In addition, it is found that the anti-pullout performance is better in the tires according to the practical samples 2 to 5 than in the tires according to the comparative samples 1 to 4 and the practical sample 1. It is considered that the movement of the carcass main portion to the outer side in the tire radial direction trd can be restricted by the contacts of the hard bead filler with the carcass main portion and thereby the carcass becomes hard to be pulled out.

In addition, since the anti-pullout performance is almost identical in the comparative sample 3 and the comparative sample 4, it is found that the thickness t is preferably not larger than 2.5 mm in view of other performances such as rolling resistance performance.

In addition, since the anti-pullout performance is almost identical in the practical sample 4 and the practical sample 5, it is found that the L/H is preferably not larger than 0.5 in view of other performances such as ride comfortability and rolling resistance performance.

(4) Other Embodiments

Although a subject matter of the present invention is disclosed through the embodiment according to the present invention, it should not be considered that the descriptions and the drawings that form parts of this disclosure limit the present invention. The present invention includes various embodiments that are not described here. Therefore, the present invention includes various embodiments that are not described here.

Figure 3:
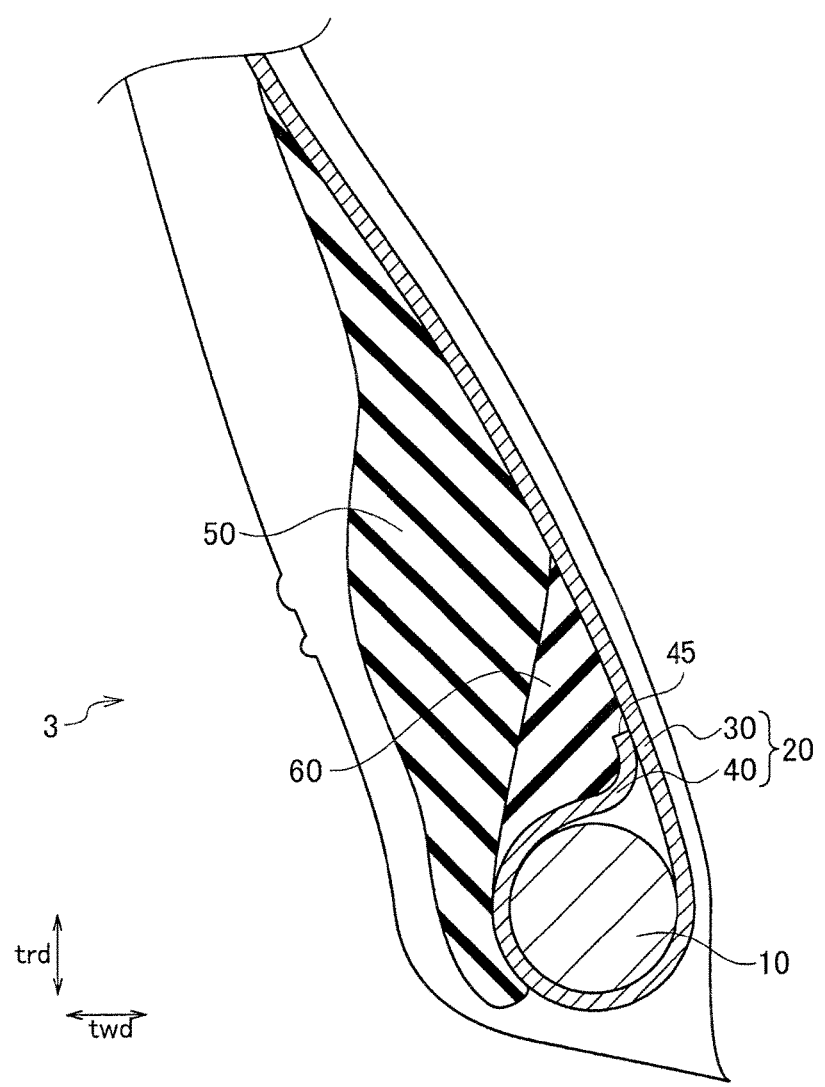
FIG. 3 is an enlarged cross-sectional view, along a tire radial direction trd and a tread width direction twd, of a bead portion 3 of a tire according to another embodiment.

For example, as shown in FIG. 3, on an outer side from the bead core 10 in the tire radial direction trd, the carcass fold-back portion 40 may extends to an inner side in the tread width direction twd and then extends to the outer side in the tire radial direction trd along the carcass main portion 30. Note that, also in this embodiment, the carcass outer-side end 45 locates on the inner side of the soft bead filler 60 in the tire radial direction trd. The carcass outer-side end 45 doesn't contact with the hard bead filler 50.

In addition, the hard bead filler 50 contacts with the carcass main portion 30 in the above-described embodiment, but it isn't limited to this. The hard bead filler 50 may not contact with the carcass main portion 30. Namely, the hard bead filler 50 may be distanced from the carcass main portion 30.

In addition, the tire 1 includes the soft bead filler 60 in the above-described embodiment, but may not always include it. In this case, i.e. in a case where the tire 1 includes only a single bead filler (the hard bead filler 50), the contact length L is a length in the tire radial direction trd where the carcass main portion 30 and the single bead filler contact with each other.

A tire according to the present invention is preferably used as a tire for a light truck (LTR), for example. If it has a so-called 1-ply structure tire provided with only the carcass 20 without other carcasses, its weight can be reduced. A tire according to the present invention can improve durability of its bead portion, even if it has a 1-ply structure tire.

As already mentioned, the present invention includes various embodiments that are not described here. Therefore, a technical scope of the present invention is determined only by matters that and specifies the invention according to Claims and reasonable from the above descriptions.

Note that all contents of a Japanese Patent Application No. 2012-245186 (filed on Nov. 7, 2012) are incorporated into the Description of the present application by reference.

INDUSTRIAL APPLICABILITY

As described above, a tire according to the present invention is useful especially for a tire with the wind bead structure in order to improve durability of its bead portion by restricting a pullout of its carcass.

The invention claimed is:

1. A tire that includes a pair of bead cores, and a carcass that extends between the pair of bead cores, wherein the carcass includes a carcass main portion that extends between the pair of bead cores, and carcass fold-back portions that are folded back to outsides, along a tread width direction, of the pair of bead cores, respectively, and the carcass fold-back portions are wound around the bead cores, respectively, and each of the carcass fold-back portions includes a carcass outer-side end that is an outer-side distal end in a tire radial direction, the tire comprises:
   a hard bead filler that is arranged on an outer side of the carcass in the tread width direction; and
   a soft bead filler that is softer than the hard bead filler, the hard bead filler and the soft bead filler being completely embedded in the tire, wherein:
   the hard bead filler extends, along the tire radial direction, from an outer side of the bead core at least to a center of the bead core,
   the soft bead filler is located between the carcass outer-side end and the hard bead filler along the tire radial direction, such that the carcass outer-side end is separated from the hard bead filler by the soft bead filler, and
   a thickness of the hard bead filler along the tread width direction is not shorter than 0.5 mm on a straight line passing over the center of the bead core in the tread width direction,
   wherein:
   a length, along the tire radial direction, of a region where the hard bead filler and the carcass main portion contact with each other is a contact length L, a length, along the tire radial direction, from an outer-most surface of a tread surface that contacts with a road surface in the tire radial direction to a bead toe that is an inner-most portion of a bead portion in the tire radial direction is a tire height H, and a ratio L/H of the contact length L to the tire height H is not smaller than 0.2 and not larger than 0.5.

2. The tire according to claim 1, wherein
the hard bead filler contacts with the carcass main portion.

3. The tire according to claim 1, wherein the ratio L/H of the contact length L to the tire height H is not smaller than 0.3 and not larger than 0.5.

4. The tire according to claim 1, wherein the thickness of the hard bead filler along the tread width direction is not larger than 2.5 mm on the straight line passing over the center of the bead core in the tread width direction.

5. The tire according to claim 1, wherein the carcass outer-side end is axially inward of a radial line that intersects the center of the bead core.

* * * * *